(12) United States Patent
Furukawa

(10) Patent No.: US 8,550,570 B2
(45) Date of Patent: Oct. 8, 2013

(54) DUMP TRUCK

(75) Inventor: Hiroyasu Furukawa, Atsugi (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/516,793

(22) PCT Filed: Feb. 1, 2012

(86) PCT No.: PCT/JP2012/052242
§ 371 (c)(1),
(2), (4) Date: Jun. 18, 2012

(87) PCT Pub. No.: WO2012/169219
PCT Pub. Date: Dec. 13, 2012

(65) Prior Publication Data
US 2012/0326490 A1    Dec. 27, 2012

(30) Foreign Application Priority Data
Jun. 10, 2011    (JP) .................................. 2011-130032

(51) Int. Cl.
*B60T 7/12*      (2006.01)

(52) U.S. Cl.
USPC ................................................ 303/7; 701/71

(58) Field of Classification Search
USPC .......... 303/3, 7, 113.1–113.5, 119.3; 180/6.3, 180/242, 306, 308; 701/71, 72, 88
See application file for complete search history.

(56) References Cited

U.S. PATENT DOCUMENTS

| | | | |
|---|---|---|---|
| 3,148,364 A * | 9/1964 | Engels et al. | 340/526 |
| 3,272,566 A * | 9/1966 | Clack | 303/13 |
| 5,236,250 A * | 8/1993 | Moody et al. | 303/7 |
| 7,869,927 B2 * | 1/2011 | Uematsu | 701/70 |
| 8,014,927 B2 * | 9/2011 | Uematsu | 701/71 |
| 8,352,145 B2 * | 1/2013 | Uematsu et al. | 701/88 |
| 2004/0183364 A1 * | 9/2004 | Marsh et al. | 303/7 |
| 2007/0235275 A1 * | 10/2007 | Judy | 188/355 |

FOREIGN PATENT DOCUMENTS

| | | |
|---|---|---|
| JP | H02-68871 U | 5/1990 |
| JP | 2000-289596 A | 10/2000 |
| JP | 2001-055128 A | 2/2001 |

\* cited by examiner

*Primary Examiner* — Christopher Schwartz
(74) *Attorney, Agent, or Firm* — Fish & Richardson P.C.

(57) ABSTRACT

A dump truck is provided with service brakes provided on front wheels, and a separating block that separates and outputs hydraulic oil into each of the service brakes. The separating block is offset in a vehicle width direction from an exhaust pipe that is arranged substantially in a middle of the dump truck in the vehicle width direction. Hydraulic lines that connect the separating block and each of the service brakes are arranged to pass through the middle of the dump truck in the vehicle width direction, and are installed in a row between the separating block and the middle.

20 Claims, 12 Drawing Sheets

DUMP TRUCK

CROSS-REFERENCE TO RELATED APPLICATIONS

This application claims priority to Application No. PC/JP2012/052242 filed Feb. 1, 2012, which application claims priority to Japanese Application No. 2011-130032, filed on Jun. 10, 2011. The contents of the above applications are incorporated herein by reference in their entireties.

TECHNICAL FIELD

The invention relates to a dump truck, in particular to an improvement in an arrangement of a brake device box.

BACKGROUND ART

A protective cover for a large dump truck operating in a mine and other sites has been conventionally known. The protective cover that covers a rear part of an engine is attached to a portal frame that separates the engine and hydraulic piping provided along a vehicle frame in order to keep the pressure oil splattering from a damaged part from spattering over the engine when the hydraulic piping is damaged (See Patent Literature 1).

The dump truck discharges exhaust gas from the engine through a vessel, in which the vessel is warmed by letting exhaust gas run though the vessel, resulting in an improvement in releasing earth, sand and the likes loaded in the vessel. Hence, an exhaust pipe for a passage of exhaust gas is disposed between the engine and the vessel.

On the other hand, a braking system for the dump truck is configured so that a brake hydraulic pressure in accordance with pedal operation of a service brake (foot brake) is divided into right-side and left-side brakes at a separating block, effecting an operation of a multi-disc wet brake attached to each of right and left wheels. In the above system, when the length of pipe (especially for hydraulic pipe channel for front brakes) from the separating block to the brake differs in the right and left brakes, a time lag occurs in the start timing for effecting the right and left brakes, resulting in one-sided brake operations and consequent swaying of the vehicle body. To prevent the above situation happening, the separating block for the front brake is positioned in the middle between the right and left sides of the vehicle body at a rear part of a platform, so that the right piping and the left piping are the same in length.

CITATION LIST

Patent Literature(s)

Patent Literature 1: Utility Model Publication No. 2-68871

SUMMARY OF INVENTION

Problem(s) to be Solved by the Invention

However, since the hydraulic devices of a dump truck such as a separating block are disposed above an exhaust pipe of which temperature tends to become high, a complicated fire prevention structure is used that keeps hydraulic oil from spattering on the high-temperature exhaust pipe even when the hydraulic oil is blown out of a connection between the hydraulic devices and hydraulic pipe or out of a joint between the hydraulic pipes, in the same manner as the construction machine disclosed in Patent literature 1.

Specifically, the exhaust pipe is covered by a protective cover. The hydraulic device including a separating block is housed by a box-shaped member such as a brake device box. Further, in order to keep the blown-out hydraulic oil from leaking out of the brake device box, a gap of the brake device box is covered with a rubber plate, a drain hose is provided to the brake device box, or a partitioned section is provided on the fire prevention cover so that the hydraulic oil leaked out of the brake device box does not flow toward a front side or right or left side to reach the exhaust pipe.

An object of the invention is to provide a dump truck that eliminates a necessity of a complicated fire-prevention structure while not creating a gap between brakes on a right wheel and on a left wheel in a time brakes start operating.

Means for Solving the Problem(s)

A dump truck according to a first aspect of the invention includes: wheels that are arranged on both sides of a vehicle body frame in a vehicle width direction; service brakes that are provided on each of the wheels on both sides; and a separating block that separates and outputs hydraulic oil for effecting brake into each of the service brakes. The separating block is provided in a manner offset in the vehicle width direction from a middle of the vehicle body frame in the vehicle width direction. Hydraulic lines connecting the separating block and each of the service brakes are arranged to pass approximately the middle of the vehicle body frame in the vehicle width direction and being installed in a row from the separating block to the middle.

The dump truck according to a second aspect of the invention includes a cab that is provided on an end of the dump truck in the vehicle width direction, the separating block being provided behind the cab The dump truck according to a third aspect of the invention includes a service brake valve and a retarder control valve that adjust a supply of hydraulic oil to the service brakes; and a shuttle valve that outputs either hydraulic oil from the service brake valve or hydraulic oil from the retarder control valve, whichever a pressure of the hydraulic oil is higher, the shuttle valve being provided behind the cab, hydraulic lines connecting between the shuttle valve and the service brake valve and between the shuttle valve and the retarder control valve being arranged in a manner that effects a passage of the hydraulic lines approximately in the middle of a vehicle body frame in the vehicle width direction and being installed in parallel with hydraulic lines connecting between the separating block and each of the service brakes.

The dump truck according to a fourth aspect of the invention includes a brake device box that has a box shape and houses the shuttle valve and the separating block.

The dump truck according to a fifth aspect of the invention is provided with the brake device box that houses a solenoid valve for an exhaust brake.

The dump truck according to a sixth aspect of the invention includes the brake device box that houses an ABS cancellation valve and an ABS valve, both valves designed for an ABS (Antiskid Brake System; Antilock Brake System).

According to the first aspect of the invention, brake hydraulic devices (e.g. separating block) are offset from the middle of the vehicle body frame in the vehicle width direction, and the brake hydraulic devices are consequently not located above devices of high temperatures (e.g. exhaust pipe, exhaust turbocharger and engine) and a protective cover that covers the devices, so that the hydraulic oil blown out from the brake hydraulic device does not fall over the devices of high temperatures. Hence, a conventional complicated fire-prevention structure can be made unnecessary.

Further, the hydraulic lines that connect the separating block and the service brakes run through approximately the middle of the vehicle body frame in the vehicle width direction and are installed in a row, so that the hydraulic lines for both right-side and left-side service brakes can be made substantially identical in length, thus reducing a time lag between each of the service brakes until braking force is generated by each of the service brakes, thereby preventing one-sided brake operations.

According to the second aspect of the invention, no devices and portions of high temperatures but wheels and other portions are disposed below the cab that is arranged near an end of the vehicle body frame in the vehicle width direction. Hence, by disposing the separating block at the rear of the cab, even in an unlikely event of leaking the hydraulic oil from the separating block, the hydraulic oil does not fall over devices of high temperatures and the like, thus effectively preventing fire.

According to the third aspect of the invention, since the hydraulic lines between the shuttle valve and the service brake valve and between the shuttle valve and the retarder control valve run through approximately the middle of the vehicle body frame in the vehicle width direction and are installed in a row, one-sided brake operations can be further effectively prevented.

According to the fourth to the sixth aspects of the invention, the brake device box houses hydraulic devices (e.g. shuttle valve, separating block, solenoid valve for an exhaust brake, ABS cancellation valve and ABS valve), so that hydraulic lines connecting the hydraulic devices as well as connectors of hydraulic lines can also be collectively arranged. The fire-prevention structure of the connectors can be provided by the protective cover and the like collectively covering the concentrated connectors, so that it is not necessary to provide individual fire-prevention structure and the like, thereby further simplifying the structure.

Furthermore, since the hydraulic devices are covered by the brake device box, not only an appearance but also weather resistance and durability of the hydraulic devices can be improved.

BRIEF DESCRIPTION OF DRAWING(S)

DESCRIPTION OF EXEMPLARY EMBODIMENT(S)

The following is a detailed description of an exemplary embodiment of the invention with reference to drawings.

It should be noted that "front", "rear", "right" and "left" directions in the following description refer to the same direction as the "front", "rear", "right" and "left" directions for an operator seated on a driver seat in a cab 3. Further, the left-right direction is the same as a vehicle-width direction. Furthermore, a direction of to the right and to the left means the same as a vehicle width direction.

Figure 1:
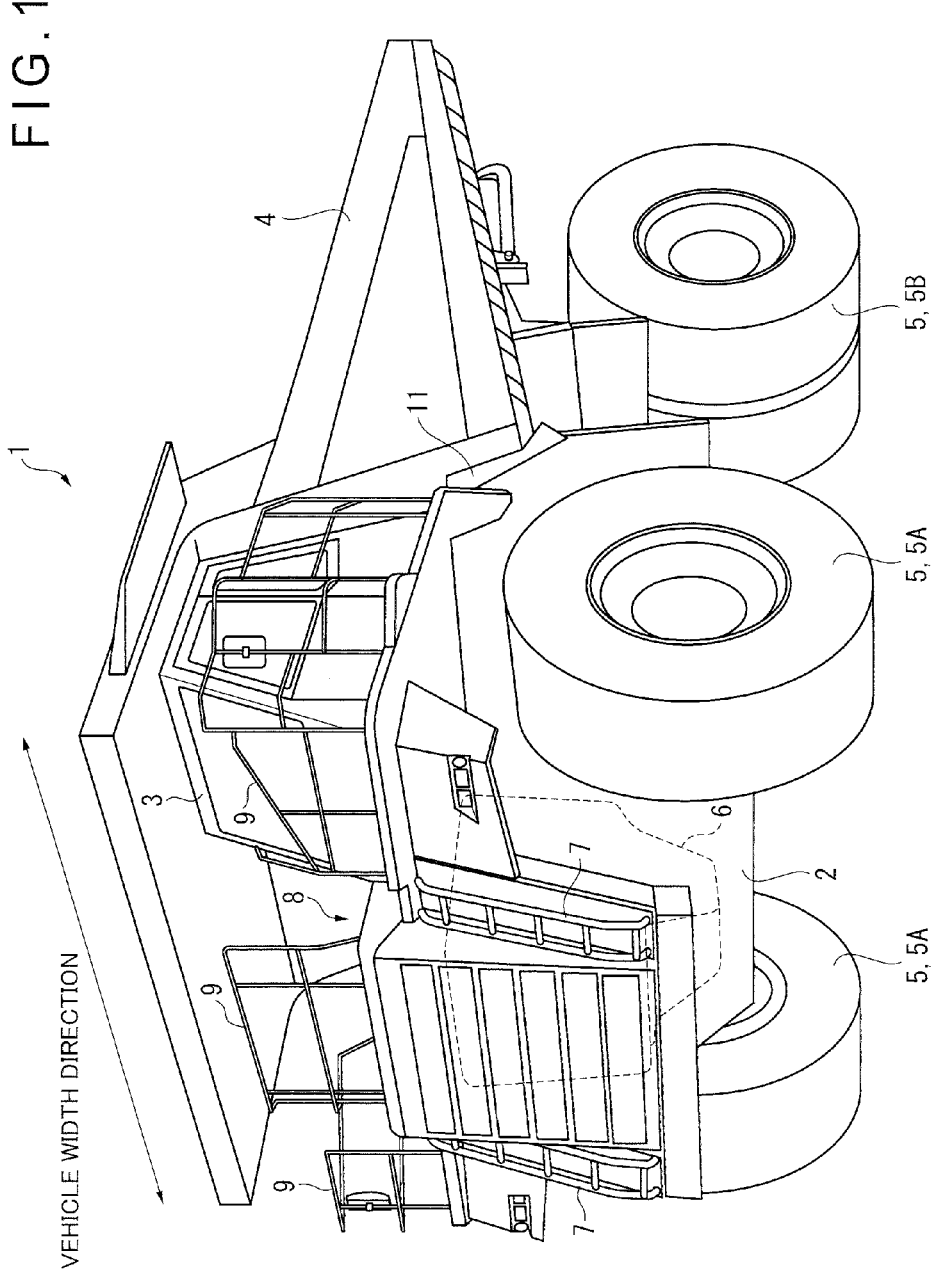
FIG. 1 is a perspective view of an entire dump truck according to a first exemplary embodiment of the invention.

FIG. 1 is a perspective view that shows an entire dump truck 1 according to the exemplary embodiment of the invention.

In FIG. 1, the dump truck 1 that is large in size comprises a vehicle body frame 2. The cab 3 for a driver to be seated is installed at a left end of an upper front part of the vehicle body frame 2. A vessel 4 that carries loads (e.g. mined rocks and stones, and earth and sand) is provided at an upper rear part of the vehicle body frame 2 in a manner that enables a rotation of the vessel 4 by an extension and contraction of a hoist cylinder (not shown).

The vehicle body frame 2 is attached with four wheels 5 (front wheels 5A and rear wheels 5B) on the front-right, the front-left, the rear-right and the rear-left sides of the vehicle body frame 2. The wheel 5 is driven by a driving force from an engine 6 installed in a front side of the vehicle body frame 2.

A ladder 7 is provided both on the front-right and the front-left sides of the vehicle body frame 2 for a driver to climb and descend between the ground and the cab 3 arranged at a high position. In an upper part of the vehicle body frame 2, an area adjacent to the right of the cab 3 constitutes a platform 8 in which maintenance of the engine 6 and other members is conducted from above. A handrail 9 is attached to the walkable areas including the platform 8 around the cab 3 and other areas.

Figure 2:
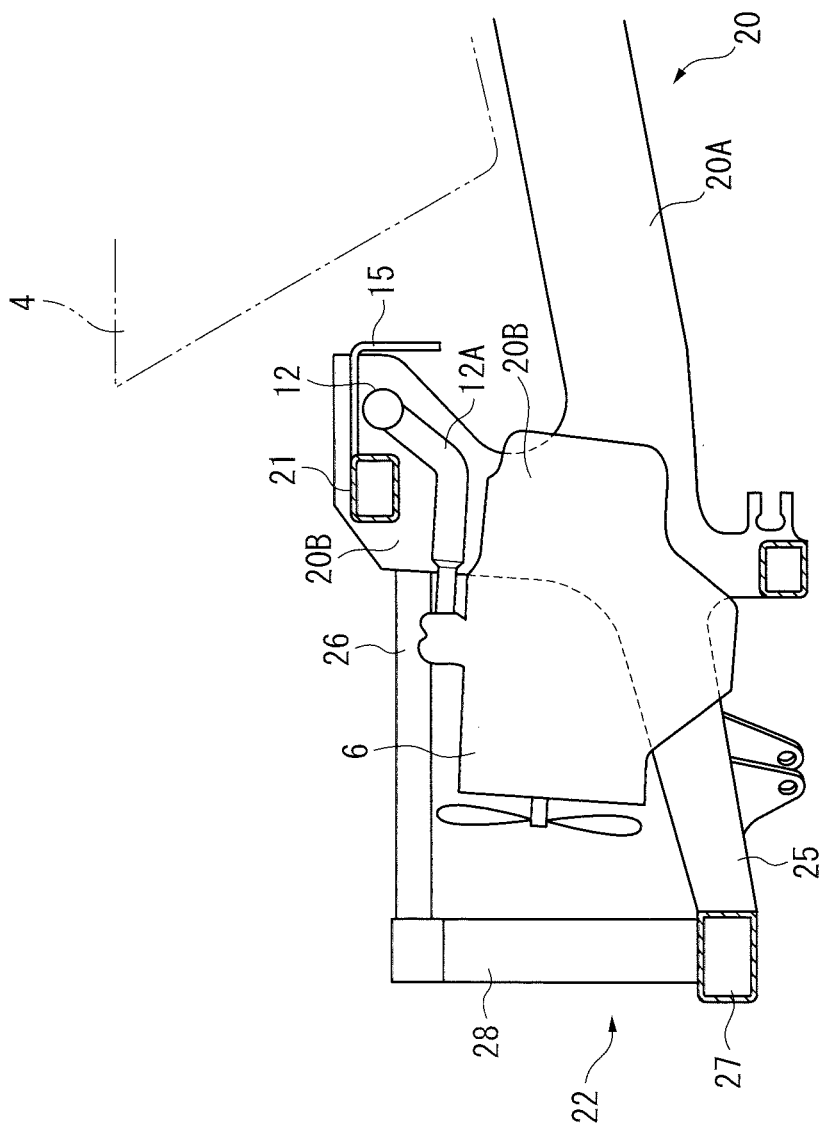
FIG. 2 is a side view of a relevant part of the dump truck showing a location of an exhaust pipe.
Figure 3:
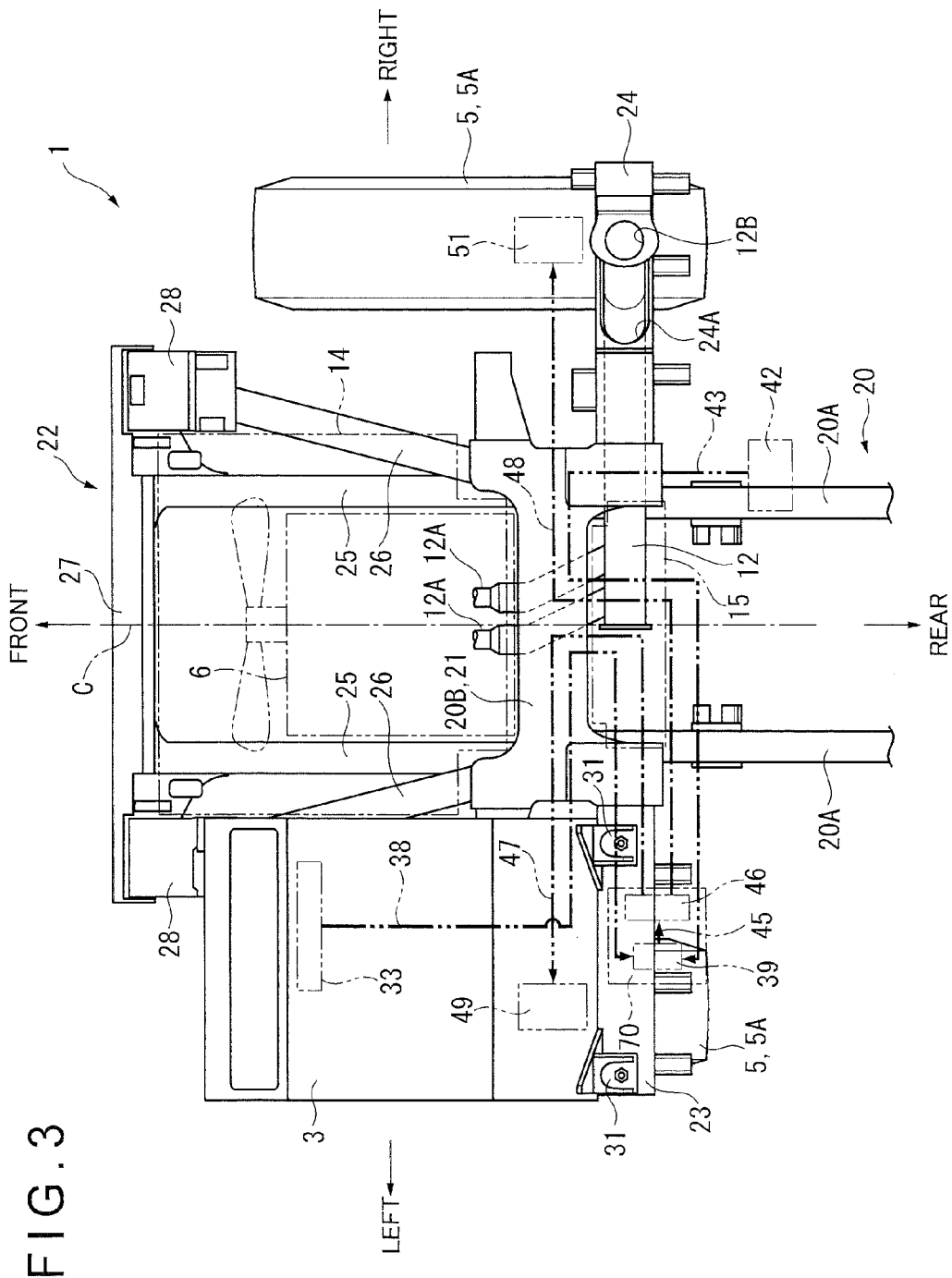
FIG. 3 is a plan view that schematically shows a relevant part of the dump truck and a hydraulic channel for a front brake.

FIG. 2 shows a side view of a relevant part of a front side of the vehicle body frame 2. FIG. 3 shows a plan view of the relevant part of the front side of the vehicle body frame 2. A chain line C in FIG. 3 C indicates the middle of a vehicle body frame in a vehicle width direction.

As shown in FIGS. 2 and 3, the vehicle body frame 2 includes: a main frame 20 including a pair of right and left side frames 20A and a rectangular frame 20B vertically disposed in front of the side frames 20A; and a front support 22 integrally attached to a front side of the main frame 20.

The frame 20B of the main frame 20 includes an upper cross member 21 that extends in the right-left direction. A left-side bracket 23 that extends to the left and a right-side bracket 24 that extends to the right are provided immediately at the rear of the upper cross member 21.

The front support 22 comprises: a pair of right and left lower-side members 25 disposed at an extension of each of the side frames 20A; a pair of cylindrical upper-side members 26 arranged above each of the lower-side members 25; a front cross member 27 that extends in the right-left direction to bridge ends of the lower-side member 25; and a pair of radiator supports 28 each vertically bridging the ends of the lower-side members 25 and the upper-side members 26. The engine 6 is housed by the front support 22. An engine hood 14 covering the engine 6 is secured to the upper-side member 26 and the like on an upper part of the front support 22.

A back side of the cab 3 is placed on the left-side bracket 23 via right and left cab mounts 31. A rear part of a fender 11 (FIGS. 1 and 6) that covers the left front wheel 5A from above is also attached onto the left-side bracket 23. In other words, the cab 3 is positioned above the front wheel 5A in the dump truck 1. A rear part of the fender 11 that covers the right front wheel 5A from above is also attached to the right-side bracket 24.

The right-side bracket 24 houses an exhaust pipe 12 that is connected to a pair of exhaust pipes 12A from the engine 6 and extends to the right from behind the upper cross member 21. A part of the exhaust pipe 12 protrudes toward above the right-side bracket 24 via an opening 24A of the right-side bracket 24. A protruding end of the exhaust pipe 12 defines a communication opening 12B that opens upwards and communicates with an opening on a rear anchor of an exhaust communication path (not shown) that is provided in the vessel 4 when the vessel 4 is lowered.

Exhaust gas from the engine 6 flows into a rear end of the exhaust pipe 12 via a pair of exhaust pipes 12A and is discharged through the communication opening 12B on an end of the exhaust pipe 12, so that the exhaust gas is fed to the exhaust communication path of the vessel 4 to warm the vessel 4.

The above exhaust pipe 12 is heated to a high temperature by the exhaust gas.

Figure 4:
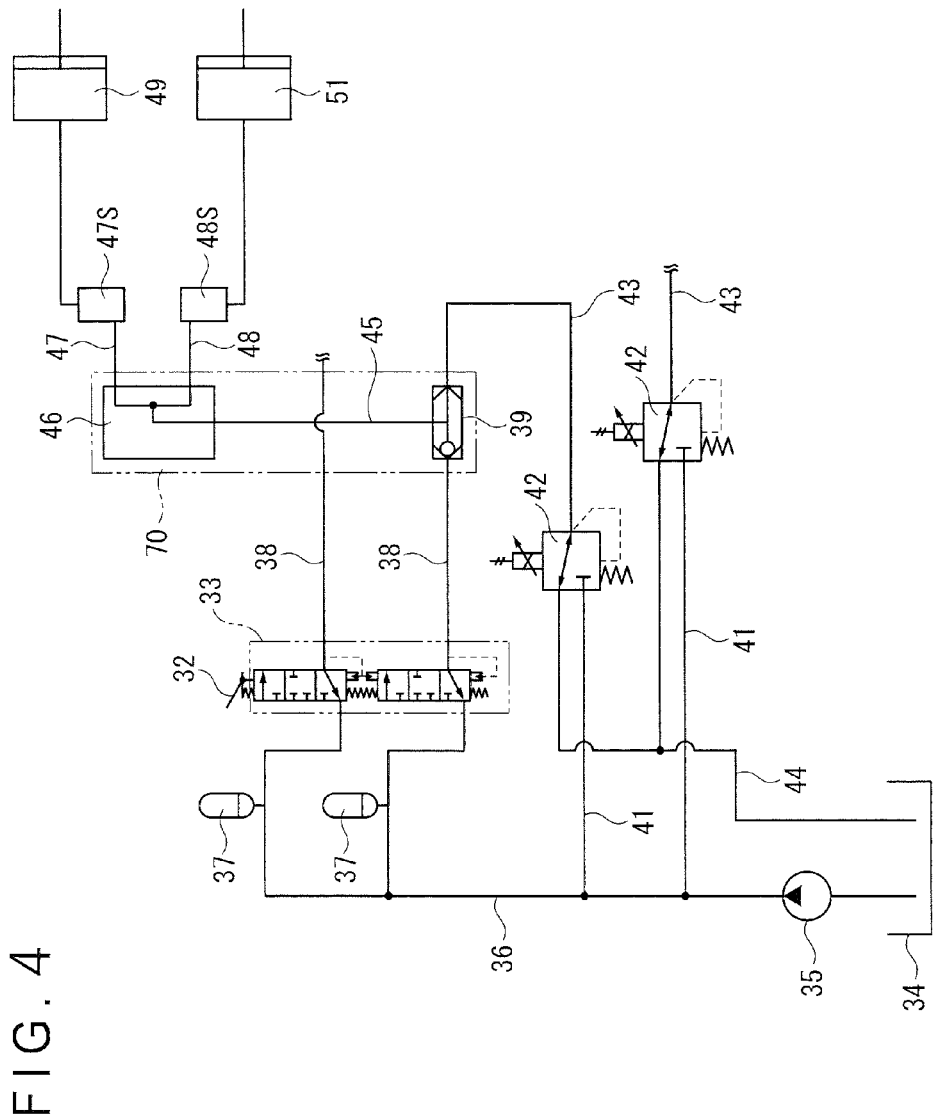
FIG. 4 is a diagram that shows a hydraulic circuit for a brake.

FIG. 3 schematically shows a piping channel for hydraulic oil for service brakes 49 and 51 provided on the right and left front wheels 5A. FIG. 4 shows a hydraulic circuit for the piping channel.

In FIGS. 3 and 4, a service brake valve 33 (hereinafter referred to as a "brake valve") outputs brake hydraulic oil for the service brakes 49 and 51 of the front wheels 5A and service brakes of the rear wheels 5B.

The brake valve 33 is supplied with hydraulic oil from a hydraulic oil tank 34 by a hydraulic pump 35. The hydraulic of the hydraulic oil is accumulated by each of accumulators 37 provided on a hydraulic line 36 that runs from the hydraulic pump 35 to the brake valve 33. When operating a pedal 32 to brake the dump truck 1, a position of an input-output port of the brake valve 33 is switched, so that hydraulic oil of a pressure accumulated by the accumulator 37 is fed to one of two input ports of the shuttle valve 39 via a hydraulic line 38.

On the other hand, a hydraulic line 41 is branched from the hydraulic line 36 that starts from the hydraulic pump 35 and is connected to a retarder proportional control valve (hereinafter referred to as a "retarder control valve") 42. When a retarder signal is not input, the retarder control valve 42 effects a communication between a hydraulic line 43 connected to the other input port of the shuttle valve 39 and a drain 44 connected to the hydraulic oil tank 34. When the retarder signal is input, hydraulic oil from the hydraulic line 41 is fed to the shuttle valve 39 via the hydraulic line 43 depending on the magnitude of the retarder signal.

The shuttle valve 39 chooses the higher one of a hydraulic pressure from the brake valve 33 supplied via the hydraulic line 38 and a hydraulic pressure from the retarder control valve 42 supplied via the hydraulic line 43, and outputs hydraulic oil of the chosen hydraulic pressure for a separating block 46 from an output port of the shuttle valve 39 via a hydraulic line 45.

FIGS. 2 to 4 show configurations for the front wheel 5A. The rear wheel 5B is omitted in figures because configurations downstream from the brake valve 33 and downstream from the retarder control valve 42 for the rear wheel 5B are identical with corresponding configurations for the front wheel 5A, so that the configurations of the rear wheel 5B can be understood in view of the configurations for the front wheel 5A.

The separating block 46 separates hydraulic oil from the hydraulic line 45 into a hydraulic line 47 and a hydraulic line 48. The hydraulic line 47 is connected to the service brake 49 for the left front wheel 5A via a slack adjuster 47S. The hydraulic line 48 is connected to the service brake 51 for the right front wheel 5A via a slack adjuster 48S. A brake device box 70 that is placed behind the cab 3 houses the separating block 46 and the shuttle valve 39.

Figure 5:
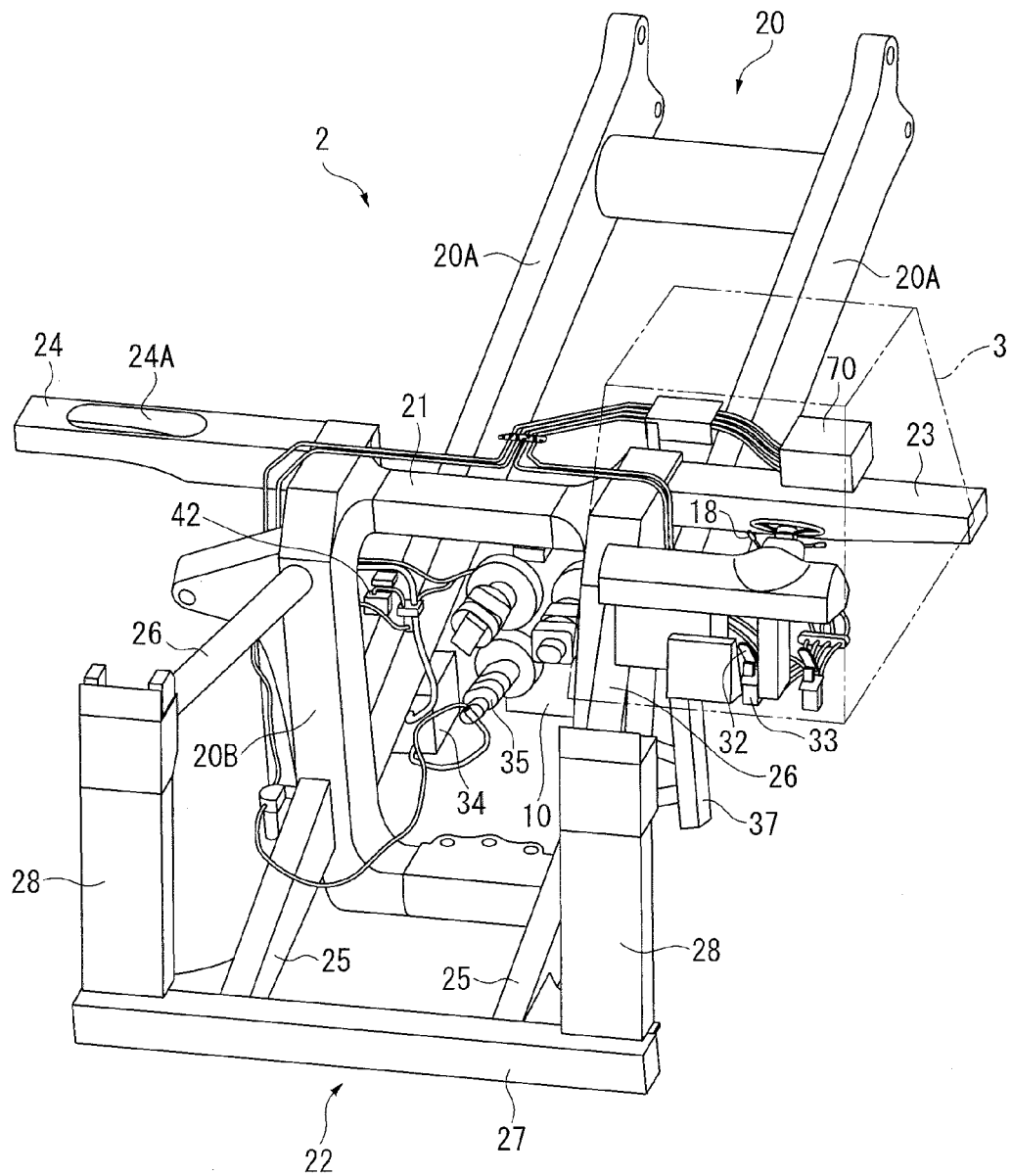
FIG. 5 is a perspective view that shows an arrangement of a hydraulic device for a brake in the dump truck.

FIG. 5 shows an arrangement of a brake hydraulic device.

As shown in FIG. 5, the brake valve 33 mounted with the pedal 32 is provided on a floor area in the cab 3. The hydraulic oil tank 34 is disposed under the side frame 20A on the right. A transmission 10 is disposed at the back of the engine 6, while a power takeoff (PTO), to which the hydraulic pump 35 is attached, is provided in front of the transmission 10. In other words, the hydraulic pump 35 is disposed between the engine 6 and the transmission 10. The accumulator 37 for the service brakes 49 and 51 is attached to the left side of the perimeter frame 20B. The retarder control valve 42 is attached to the side frame 20A on the right.

A steering column shown in FIG. 5 is provided with a retarder control lever 18. A controller (not shown) generates retarder signals in accordance with an amount of operations by the retarder control lever 18, and outputs the retarder signals for a solenoid of the retarder control valve 42, so that an opening degree of the retarder control valve 42 is controlled. Thus, braking forces of a retarder brake in proportion to an amount of operations by the retarder control lever 18 can be generated.

Figure 6:
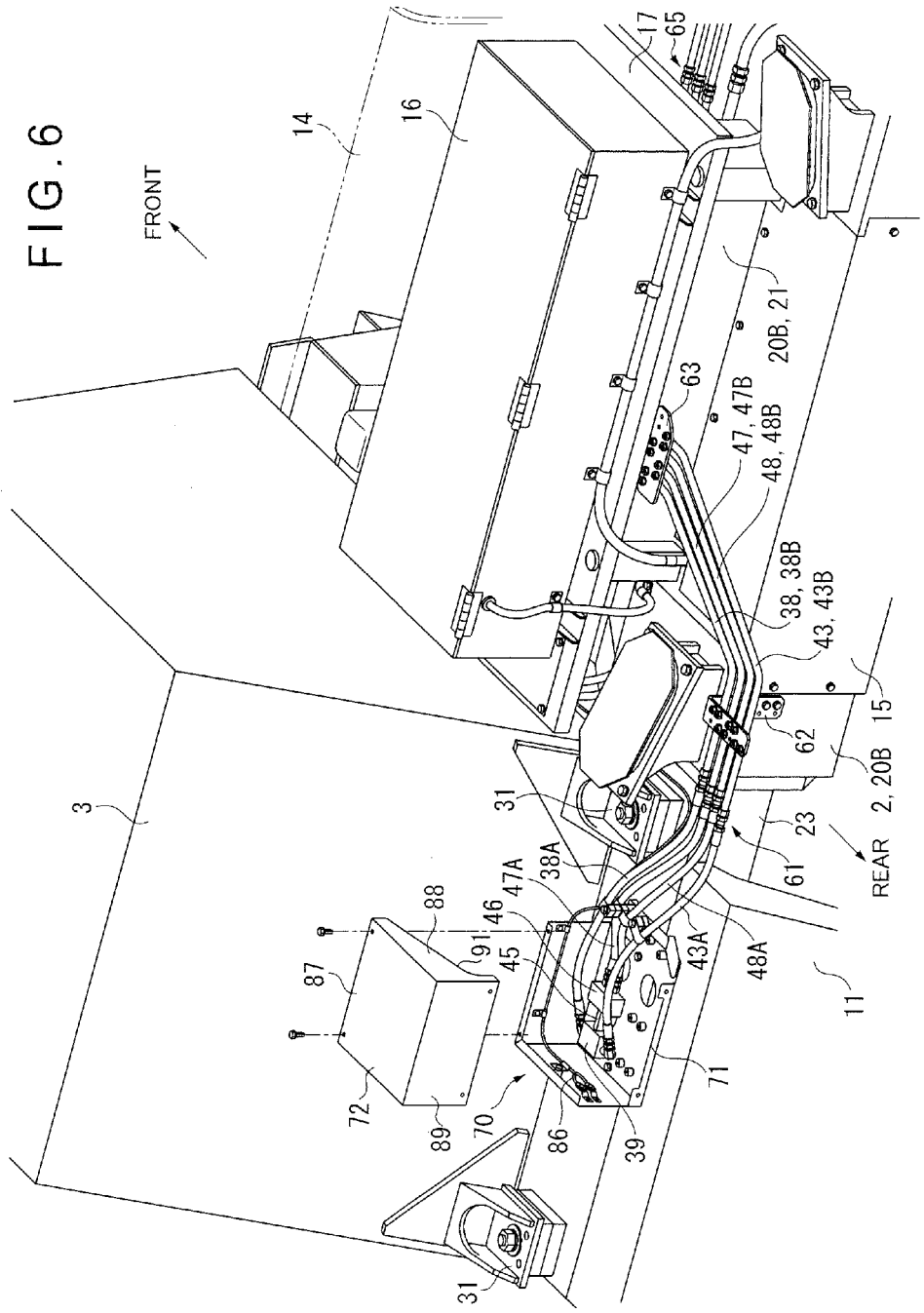
FIG. 6 is a perspective view that shows a relevant part of the dump truck.
Figure 7:
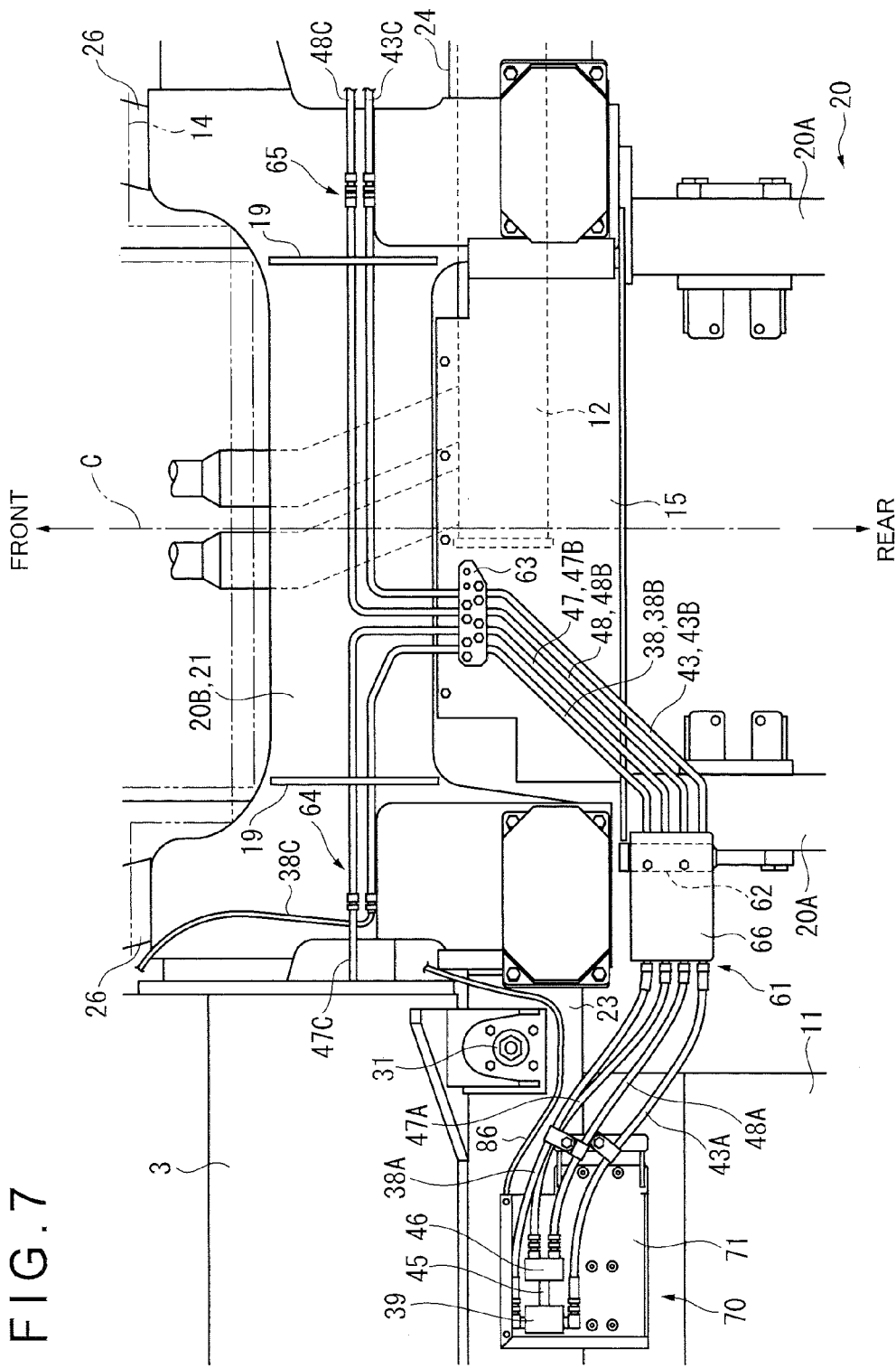
FIG. 7 is a plan view that shows a relevant part of the dump truck.

FIGS. 6 and 7 are a perspective and a plan view of a relevant part of the dump truck 1, respectively.

As shown in FIGS. 6 and 7, an upper surface of the upper cross member 21 is positioned behind an engine hood 14. A protective cover 15 of a reverse L shape that covers the exhaust pipe 12 from above and behind is provided at the back of the upper cross member 21. Upper surfaces of the protective cover 15, the upper cross member 21 and the engine hood 14 are flat and substantially flush, the upper surfaces defining the platform 8. A battery box 16 (not shown in FIG. 7) in which a battery is installed is provided on the platform 8 at a position corresponding to the upper cross member 21 in a manner spaced by a predetermined height between the battery box 16 and the platform 8.

Conventionally, a brake device box has been attached onto an upper part of the protective cover 15. In this exemplary embodiment, however, the brake device box 70 is attached onto the left-side bracket 23 at a rear part of the cab 1. Other than the front wheel 5A, no items, including devices of high temperatures such as the exhaust pipe 12, are arranged immediately under the left-side bracket 23. Thus, when the hydraulic oil splatters from devices in the brake device box 70, the hydraulic oil does not fall over the exhaust pipe 12, so that a complicated fire-prevention structure around the brake device box 70 is unnecessary. Further, since leaked oil is not likely to trickle on pipes and splash over the exhaust pipe 12, a complicated sealing mechanism is not required for the brake device box 70.

The brake device box 70 accommodates the shuttle valve 39 and the separating block 46. As described with reference to FIGS. 2 to 4, the shuttle valve 39 is connected to ends of the hydraulic lines 38 and 43, while the separating block 46 is connected to ends of the hydraulic lines 47 and 48. The hydraulic lines 38, 43, 47 and 48, all arranged in a space under the battery box 16 in a left-right direction, extends rearward through approximately the middle of a vehicle body frame in the vehicle width direction (see a chain line C in FIG. 7.). The hydraulic lines 38, 43, 47 and 48 then are connected to the shuttle valve 39 or the separating block 46 that are arranged in the brake device box 70 attached at the back of the cab 3.

Specifically, the hydraulic line 38 includes a flexible hose 38A that has a first end connected to the shuttle valve 39, and a metal tube 38B that has a first end connected to the other end of the hose 38A. The hose 38A and the tube 38B are connected by a first connector 61 that is positioned near a base end of the left-side bracket 23. The tube 38B is held near the first end thereof by a U-shape bolt onto a holding bracket 62 of a reverse L shape. A middle part of the tube 38B is held by a U-shape bolt onto a holding bracket 63 that is attached on a lower surface of a support base 17 of the battery box 16, and is bent leftward under the battery box 16. A second end of the tube 38B is connected to a tube 38C by a second connector 64. The tube 38C defines a part of the hydraulic line 38 and is eventually connected to the brake valve 33 that is provided on a floor of the cab 3.

Likewise, the hydraulic line 43 includes a flexible hose 43A and has a first end connected to the shuttle valve 39 and a metal tube 43B that has a first end connected to the other end of the hose 43A. The hose 43A and the tube 43B are connected to one another by the first connector 61. The tube 43B is held onto the holding bracket 62 near the first end thereof. A middle part of the tube 43B runs through the middle of a vehicle body frame in the vehicle width direction and is held onto a holding bracket 63 by a U-shape bolt, and is bent rightward the right under the battery box 16. A second end of the tube 43B is connected to a tube 43C by a third connector 65. The tube 43C defines a part of the hydraulic line 43 and is eventually connected to the retarder control valve 42 (FIGS. 3 and 4) that is arranged in an approximately opposite side from the brake valve 33 in the vehicle width direction.

Furthermore, the hydraulic lines 47 and 48 connected to the separating block 46 includes: flexible hoses 47A and 48A that have first ends each connected to the separating 46; and metal tubes 47B and 48B that have first ends each connected to the second ends of the hoses 47A and 48A. The hoses 47A and 48A and the tubes 47B and 48B are mutually connected by the first connector 61. The tubes 47B and 48B are held onto the holding bracket 62 near the first ends thereof. A middle part of each of the tubes 47B and 48B runs through the middle of the vehicle body frame in the vehicle width direction and is held onto the holding bracket 63 by a U-shape bolt.

Then, a middle part of the tube 47B bends leftward under the battery box 16, and the second end of the tube 47B is connected to a tube 47C by the second connector 64. The tube 47C constitutes a part of the hydraulic line 47 and is eventually connected to the service brake 49 (FIGS. 3 and 4) for the left front wheel 5A.

On the other hand, a middle part of the tube 48B is bent rightward under the battery box 16, and the second end of the tube 48B is connected to a tube 48C at the third connector 65. The tube 48C constitutes a part of the hydraulic line 48 and is eventually connected to the service brake 51 (FIGS. 3 and 4) for the right front wheel 5A.

The hydraulic lines 38, 43, 47 and 48 run through the middle of the vehicle body frame in the vehicle width direction, so that the tubes 38B, 43B, 47B and 48B that constitute the hydraulic lines 38, 43, 47 and 48, respectively, are arranged in a row, and are attached to the holding brackets 62 and 63. The tubes 38B, 43B, 47B and 48B pass above the protective cover 15 (i.e. an area in the upper vicinity of the exhaust pipe 12 that produces high temperatures). However, the tubes 38B, 43B, 47B and 48B are provided by seamless and continuous tubes, leaving no portions where hydraulic oil leaks from above the protective cover 15. The first to third connectors 61, 64 and 65 are positioned either in front, behind, to the right or to the left from immediately above the protective cover 15, reducing the chance of hydraulic oil spattering over the protective cover 15 should hydraulic oil splatter from the first to the third connectors 61, 64 and 65.

Especially, since the first connector 61 is covered with a splattering prevention cover 66 attached to the holding bracket 62, even in an unlikely event for the hydraulic oil to be blown out, the blown-out hydraulic oil collides with the blow-prevention cover 66 and drips downward (i.e. to a section without any high-temperature component), thereby keeping the hydraulic oil from scattering toward the protective cover 15. The second and third connectors 64 and 65 are also covered by the support base 17 immediately from above the connectors 64 and 65, in which the support base serves as a splattering prevention cover. In addition, shields 19 are each installed upright near the center of a vehicle body from the second and third connectors 64 and 65, and restrains the hydraulic oil from splattering over the protective cover 15.

Since the hydraulic lines 38, 43, 47 and 48 pass the middle of the vehicle body frame in the vehicle width direction, approximately identical lengths of the hydraulic lines 47 and 48 can be made, thus preventing a time lag between working timing of right wheel brake and left wheel brake, so that a vehicle body is not swayed due to one-sided brake operations.

Since the tubes 38B, 43B, 47B and 48B for the hydraulic lines 38, 43, 47, and 48 are arranged in a row, the tubes 38B, 43B, 47B, 48B can be secured to one place using the holding brackets 62 and 63, so that an assembly process can be simplified.

Figure 8:
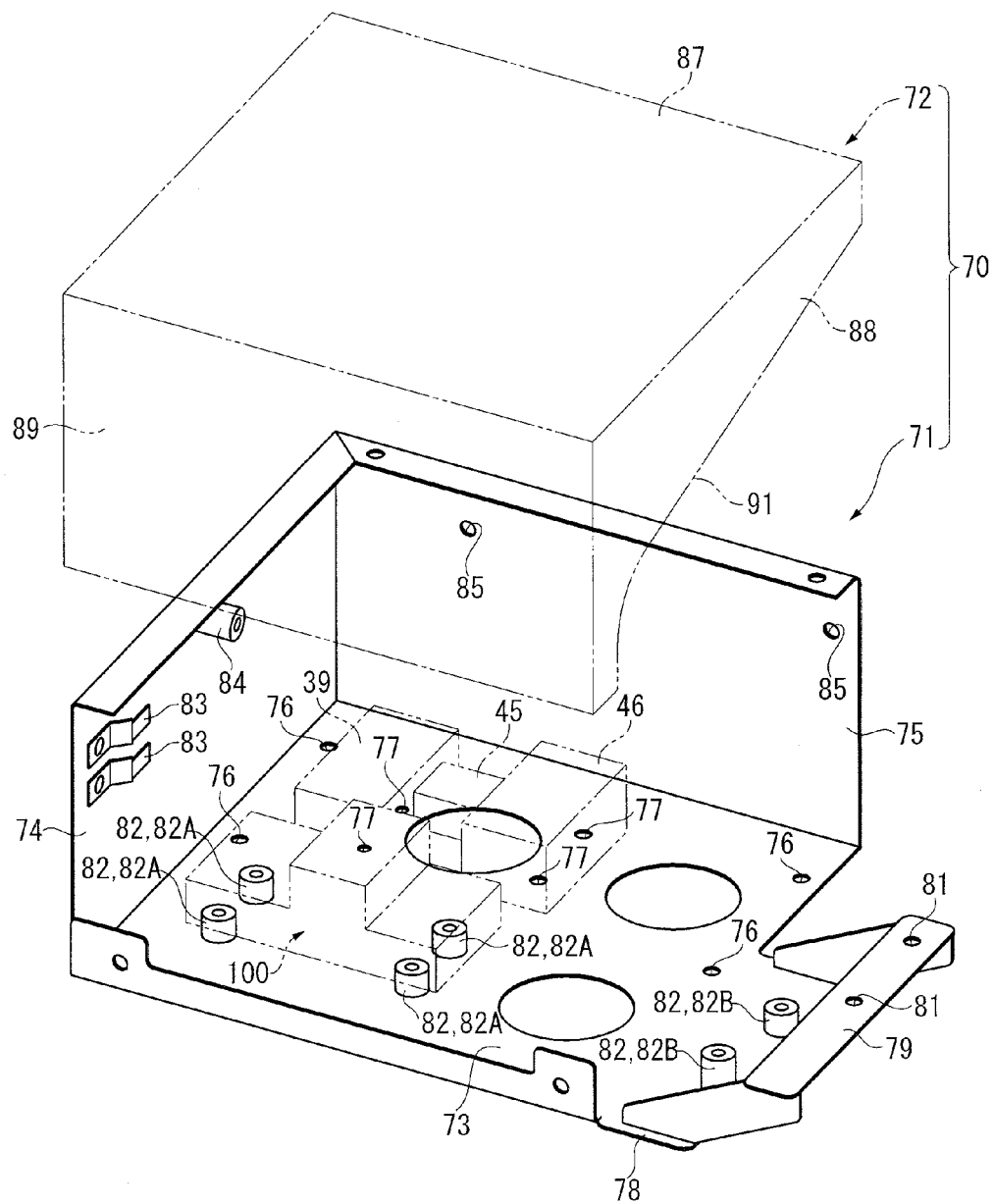
FIG. 8 is a perspective view that shows a brake device box.

FIG. 8 shows the brake device box 70.

In FIG. 8, the brake device box 70 made of a sheet metal includes a box body 71 that is secured to the left-side bracket 23 and a cover 72 that covers the box body 71.

The box body 71 includes a bottom 73 that has a substantially rectangular shape in a plan view, and a short-side lateral wall 74 and a long-side lateral wall 75 that are installed upright along two sides of the bottom 73 that are adjacent to one another.

The bottom 73 is provided with four bolt insertion holes 76. The box body 71 is secured to the left-side bracket 23 by bolts that are inserted in the bolt insertion holes 76. The bottom 73 is also provided with four bolt insertion holes 77. The shuttle valve 39 and the separating block 46 are attached to the bottom 73 by bolts that are inserted in the bolt insertion holes 77 from a back side of the bottom 73.

Furthermore, the bottom 73 is provided with an extending portion 78 that is opposed to the short-side lateral wall 74. The extending portion 78 is provided with a hose holder 79 at an elevated position. The hose holder 79 is provided with a bolt insertion hole 81 and is bolted to a clamp that holds the hoses 38A, 43A, 47A and 48A.

Moreover, the bottom 73 is provided with six mounting bosses 82. Four of the six mounting bosses 82 (a mounting boss 82A) are mounted with a solenoid valve 100 for a hydraulic actuator for a exhaust brake that is provided upon request. The remaining two mounting bosses (mounting bosses 82B) are bolted to a clamp for holding a hydraulic hose that is connected to the solenoid valve 100.

The short-side lateral wall 74 is provided with a mounting boss 84 and a pair of connector brackets 83. The long-side lateral wall 75 is provided with a pair of two bolt insertion holes 85.

Even when the solenoid valve 100 for an exhaust brake is not installed, a signal cable 86 (FIGS. 6 and 7) for the solenoid valve 100 is drawn to the inside of the box body 71, in which a male connector provided on an end of the signal cable 86 is attached to the connector bracket 83, and each of the male connector and a female connector are inserted with a blind member. When it is requested to install an exhaust brake and the solenoid valve 100 is installed in the box body 71, the male connector of the signal cable 86 is connected to a female connector of a signal cable that extends from the solenoid valve 100.

A clamp for holding the signal cable 86 is bolted to the mounting boss 84 and the bolt insertion hole 85.

The cover 72 is provided with a ceiling 87, a short-side lateral wall 88 and a long-side lateral wall 89, and is secured to the box body 71 by four bolts that are inserted from above the cover 72 and in a horizontal direction. The ceiling 87, the short-side lateral wall 88 and the long-side lateral wall 89 of the cover 72 are respectively opposed to the bottom 73, the short-side lateral wall 74 and the long-side lateral wall 75 of the box body 71, defining an entire box shape of the brake device box 70. However, the short-side lateral wall 88 of the cover 72 is provided with an opening 91, through which the signal cable 86 and the hoses 38A, 43A, 47A and 48A are arranged.

Figure 9:
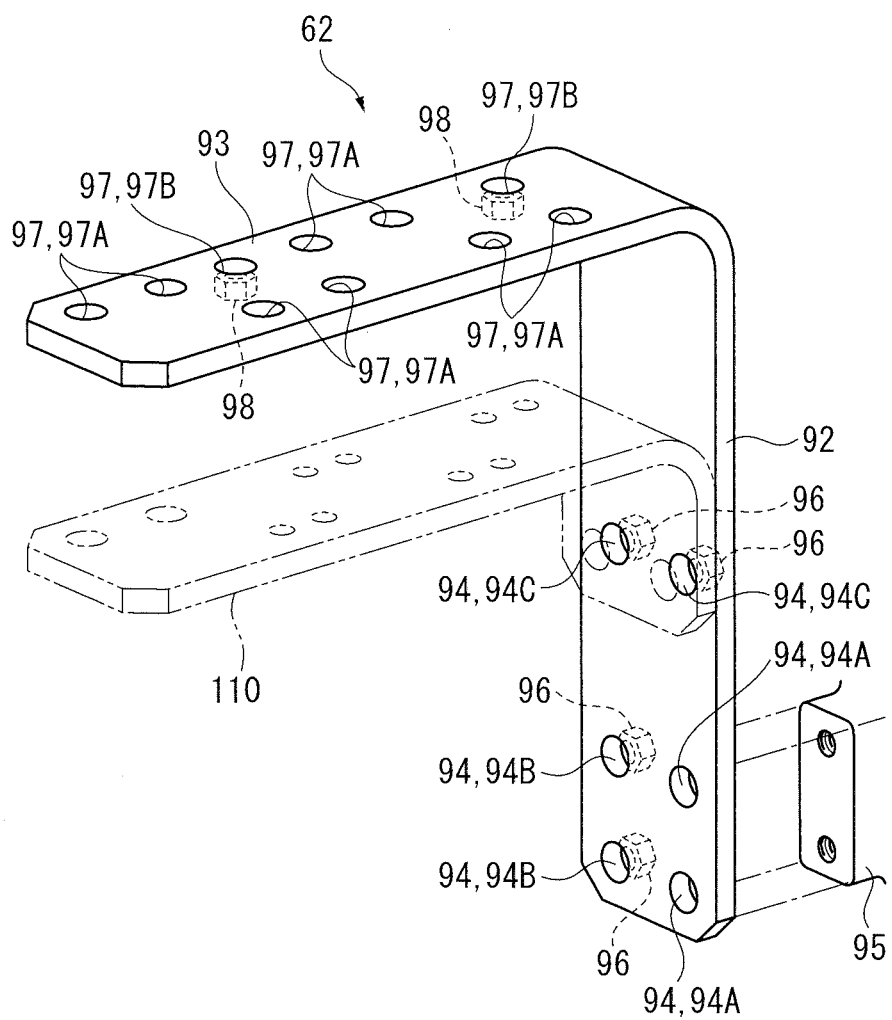
FIG. 9 is a perspective view that shows a holding bracket.

FIG. 9 shows the holding bracket 62 with a reverse L shape.

As shown in FIG. 9, the holding bracket 62 includes a vertical portion 92 that is vertically elongated and a horizontal portion 93 that extends horizontally from an upper end of the vertical portion 92.

The vertical portion 92 is provided with a plurality of bolt insertion holes 94 (six in this exemplary embodiment). From among these bolt insertion holes, a pair of bolt insertion holes 94A that are disposed in a lower part of the vertical portion 92 and each arranged in a vertical direction are used to bolt the holding bracket 62 to a rectangular mounting boss 95 that is provided on the main frame 20.

A pair of bolt insertion holes adjacent to the bolt insertion holes 94A (bolt insertion holes 94B) are used to attach a support bracket 112 shown in FIG. 10 (discussed later).

A pair of bolt insertion holes 94C that are disposed in an upper part of the vertical portion 92 and arranged in a horizontal direction are used to add and secure a holding bracket 110 that is indicated in a two-dot chain line. When the solenoid valve 100 (FIG. 8) for an exhaust brake is installed in the brake device box 70, a hose connected to the solenoid valve 100 is held onto the holding bracket 110 by a U-shape bolt. A back nut 96 is provided on a back side of the vertical portion 92 in the positions corresponding to each of the bolt insertion holes 94B and 94C.

The vertical portion 93 is provided with a plurality of (ten in this exemplary embodiment) bolt insertion holes 97. From among the bolt insertion holes, eight bolt insertion holes (bolt insertion holes 97A) are used for holding the tubes 38B, 43B, 47B and 48B by a U-shape bolt. A male screw of a U-shape bolt is inserted in the bolt insertion holes 97A from below. Though not shown with reference numerals, these bolt insertion holes for a U-shape bolt are provided in the holding bracket 110. The remaining pair of bolt insertion holes (bolt insertion holes 97B) are used to attach the above-mentioned splattering prevention cover 66. Hence, a back nut 98 is provided on a back side of the horizontal portion 93 at a position corresponding to the bolt insertion holes 97B.

Figure 10:
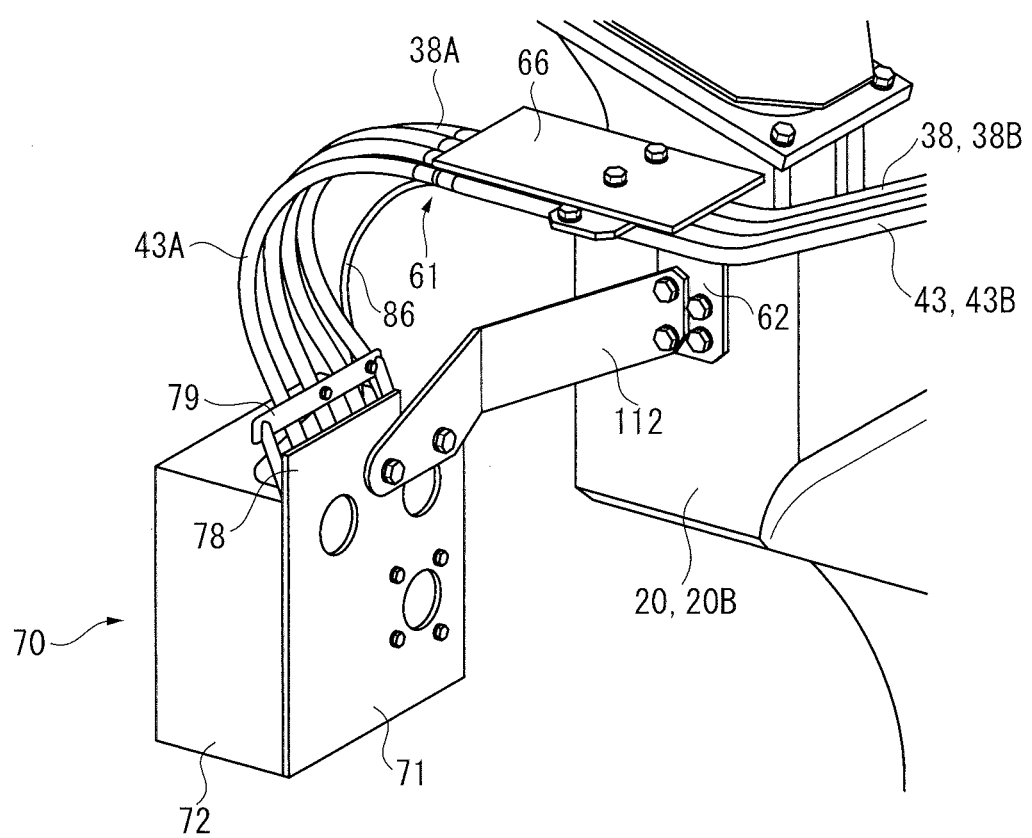
FIG. 10 is a perspective view that shows how the brake device box is supported when being transported.

FIG. 10 shows the support bracket 112.

The support bracket 112 is a member that enables the main frame 20 of a vehicle body frame 2 (i.e., the holding bracket 62 attached to the main frame 20) to support the brake device box 70 in a cantilever manner. When transporting the dump truck 1, the cab 3 is temporarily removed from the vehicle body frame 2 together with the left-side bracket 23 due to transportation constraints. The dump truck 1 is transported by a trailer truck or other similar means while not being fully assembled, and is reassembled at a place to which the dump truck 1 is transported.

When the cab 3 is removed from the vehicle body frame 2, the brake device box 70 that is secured onto the left-side bracket 23 also needs to be removed. At this time, the support bracket 112 is used to support the brake device box 70 that is removed from the vehicle body frame 2 because the brake device box 70 should not be left hanging with the hoses 38A, 43A, 47A and 48A being connected to the brake device box 70.

When the brake device box 70 remains attached to the left-side bracket 23 while being transported, the hose 38A, 43A, 47A and 48A and the like need to be instead removed from the shuttle valve 39 and the separating block 46 in the brake device box 70, thus reducing efficiency in post-transportation work by a need of re-connecting the hoses 38A, 43A, 47A and 48A and covering ends of the hoses 38A, 43A, 47A and 48A when being removed. To increase such efficiency, the brake device box 70 is detached from the left-side bracket 23 and is supported by the support bracket 112.

The flexible hoses 38A, 43A, 47A and 48A can follow a relocation of the brake device box 70.

Use of the bolt insertion hole 76 that is originally provided in the brake device box 70 simplifies an attachment of the brake device box 70 to an end of the support bracket 112. On the other hand, a base end of the support bracket 112 is bolted to the holding bracket 62 as described earlier.

When the cab 3 is reinstalled, the brake device box 70 is also detached from the support bracket 112 and attached on the left-side bracket 23 at the rear of the cab 3. Accordingly, the support bracket 112 is no more necessary and is hence disposed of as necessary.

It should be appreciated that the invention is not limited to the above exemplary embodiment but includes modifications and improvements as long as an object of the invention can be achieved.

Figure 11:
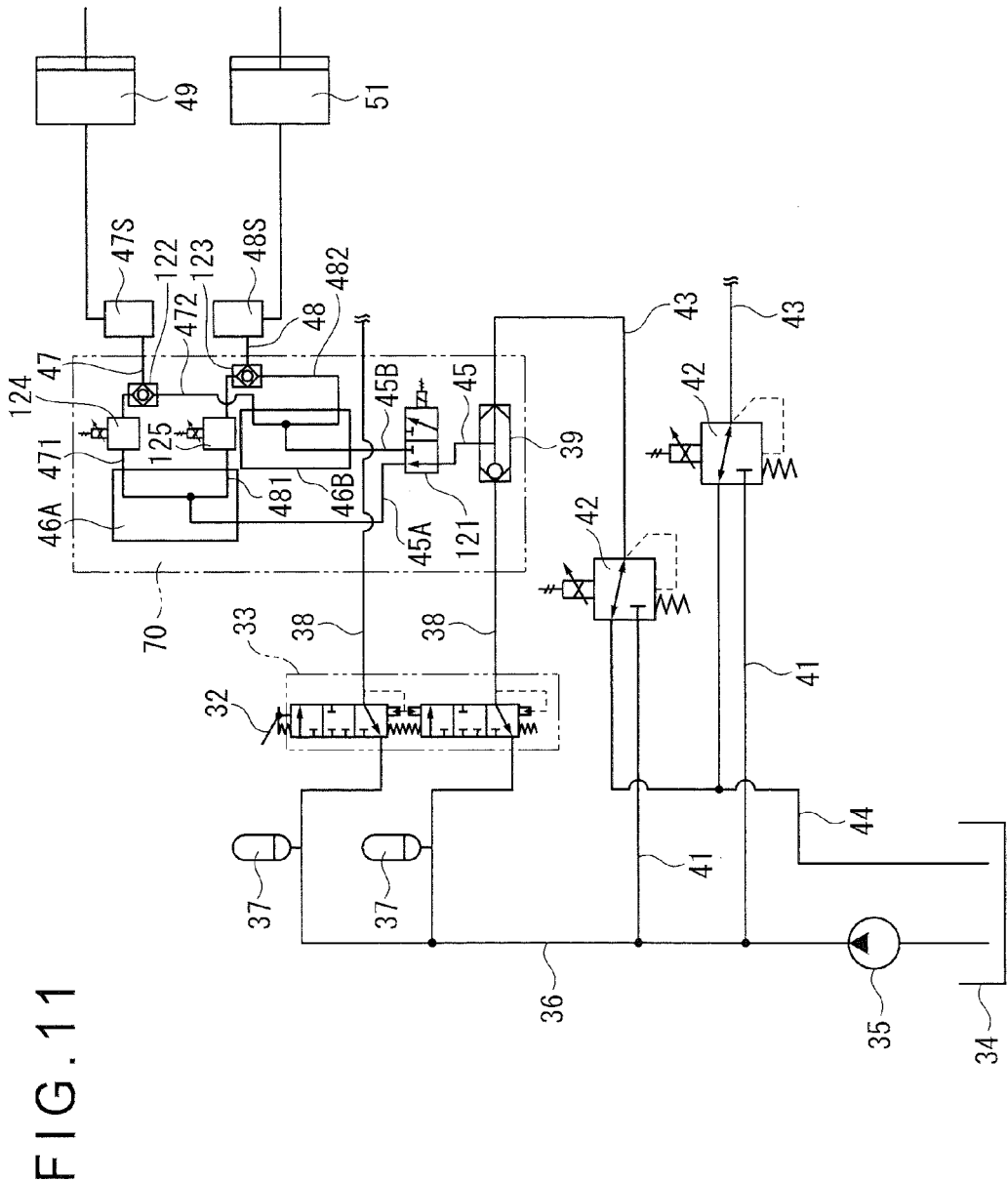
FIG. 11 is a view that shows a hydraulic circuit in a modification of the invention.

For instance, FIG. 11 shows a hydraulic circuit in which an ABS is installed.

In the dump truck 1 with ABS specifications, an ABS cancellation valve 121 is provided on the hydraulic line 45 on an output side of the shuttle valve 39. The hydraulic line 45 is divided into a hydraulic line 45A and a hydraulic line 45B on an output side of the ABS cancellation valve 121. The hydraulic line 45A is connected to a separating block 46A and the hydraulic line 45B is connected to a separating block 46B.

A pair of hydraulic lines 471 and 481 that are separated by the separating block 46A are connected to slack adjusters 47S and 48S via shuttle valves 122 and 123 and through the hydraulic lines 47 and 48, respectively. Then, the hydraulic lines 471 and 481 are provided with ABS valves 124 and 125, respectively.

On the other hand, a pair of hydraulic lines 472 and 482 that are separated by the separating block 46B are connected to slack adjusters 47S and 48S via shuttle valves 122 and 123 and through the hydraulic lines 47 and 48, respectively. However, the hydraulic lines 472 and 482 are not provided with an ABS valve.

In a state shown in FIG. 11, the ABS cancellation valve 121 is turned off, allowing hydraulic oil from the shuttle valve 39 to be supplied through the hydraulic line 45A, thus effecting an ABS as a function of the ABS valves 124 and 125.

On the other hand, when the ABS is cancelled by the ABS cancellation valve 121, hydraulic oil from the shuttle valve 39 is supplied through the hydraulic line 45B, leading to the same state as in the above exemplary embodiment.

The brake device box 70 houses the ABS cancellation valve 121, the pair of separating blocks 46A and 46B, the shuttle valves 122 and 123 and the ABS valves 124 and 125. Accordingly, the above-mentioned brake device box 70 has a larger capacity and a larger external shape than those of the brake device box 70 discussed in the aforementioned exemplary embodiment, as shown in FIG. 12.

Figure 12:
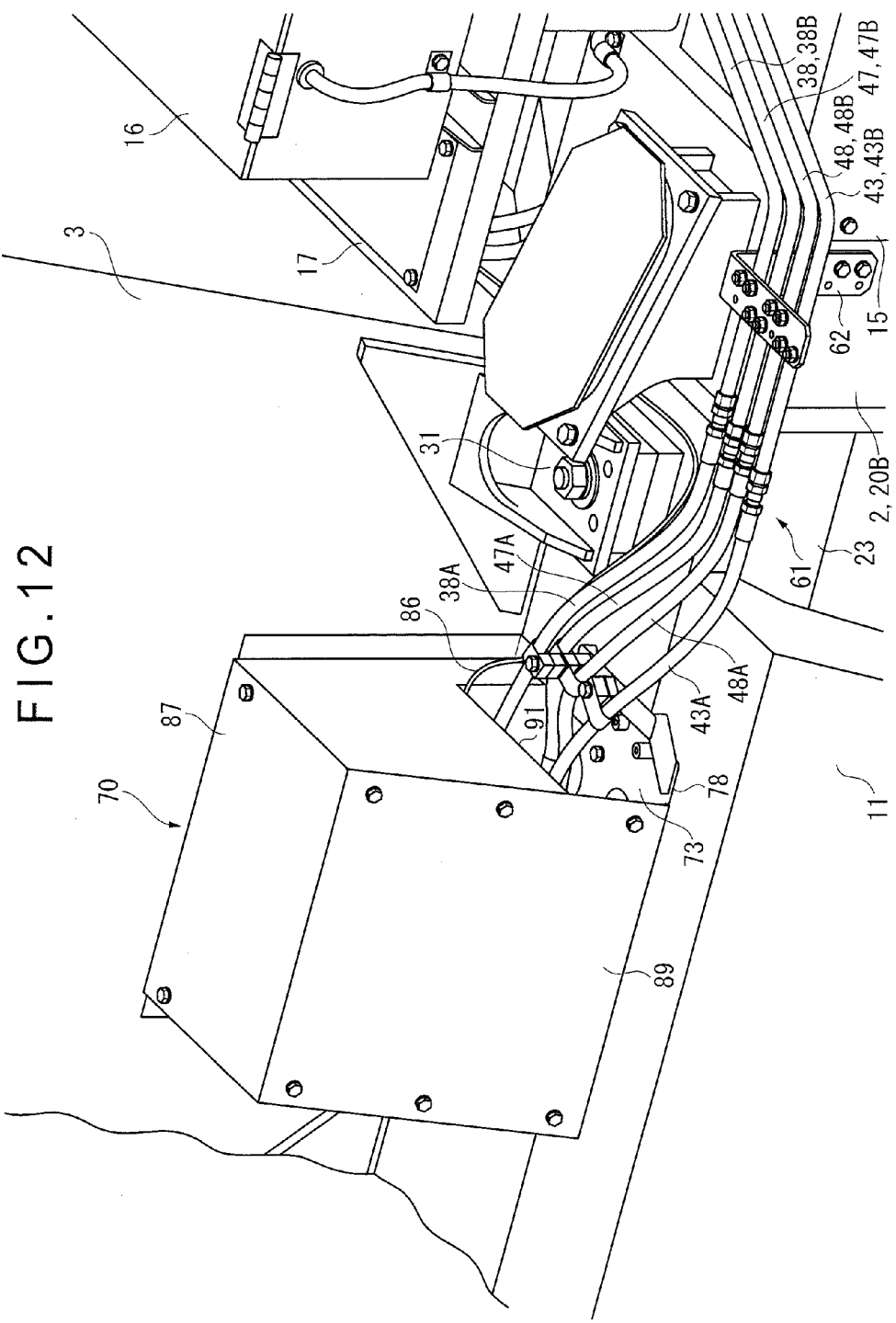
FIG. 12 is a perspective view that shows another modification of the invention.

Since other configurations are the same as in the aforementioned exemplary embodiment, the same signs as in the aforementioned exemplary embodiment are also assigned in FIGS. 10 and 12 to functional members and portions that are identical with those portions in the aforementioned exemplary embodiment.

The brake device box 70 that is large in size is also installed at the rear of the cab 3 and arranged at a position that is not above the protective cover 15 as in the aforementioned exemplary embodiment, so that an object of the invention can be achieved.

The brake device box 70 with a large size may house the solenoid valve 100 for an exhaust brake, and may also, when being transported, be supported by the main frame 20 or the like via the support bracket 112 after detaching the brake device box 70 from the left-side bracket 23.

An exhaust pipe is described as a device of high temperatures in the aforementioned exemplary embodiment, but such a device of high temperatures may alternatively be an engine body, an exhaust turbine supercharger and the like.

The invention claimed is:

1. A dump truck comprising:
wheels that are arranged on both sides of a vehicle body frame in a vehicle width direction;
service brakes that are provided on each of the wheels on both sides; and
a separating block that separates and outputs hydraulic oil into each of the service brakes,
the separating block being provided in a manner offset in the vehicle width direction from a middle of the vehicle body frame in the vehicle width direction,
hydraulic lines connecting the separating block and each of the service brakes being arranged to pass approximately the middle of the vehicle body frame in the vehicle width direction and being installed in a row from the separating block to the middle.

2. The dump truck according to claim 1, further comprising a cab provided near an end of the dump truck in the vehicle width direction, the separating block being provided at a rear of the cab.

3. The dump truck according to claim 2, further comprising:
a service brake valve and a retarder control valve for adjusting a supply of the hydraulic oil to the service brake; and
a shuttle valve that outputs one of the hydraulic oil from the service brake valve and the hydraulic oil from the retarder control valve, the outputted one of the hydraulic oil having higher hydraulic pressure than the other,
the shuttle valve being provided at a rear of the cab,
a hydraulic line connecting the shuttle valve with the service brake valve and the retarder control valve being disposed to pass the middle of the vehicle body frame in the vehicle width direction and being juxtaposed with the hydraulic line connecting the separating block and each of the service brakes.

4. The dump truck according to claim 3, wherein a brake device box of a box shape houses the shuttle valve and the separating block.

5. The dump truck according to claim 4, wherein the brake device box houses a solenoid valve for an exhaust brake.

6. The dump truck according to claim 5, wherein the brake device box houses an ABS cancellation valve and an ABS valve for an ABS.

7. The dump truck according to claim 4, wherein the brake device box houses an ABS cancellation valve and an ABS valve for an ABS.

8. A dump truck comprising:
wheels that are arranged on both sides of a vehicle body frame in a vehicle width direction;
service brakes that are provided on each of the wheels on both sides; and
a separating block that separates and outputs hydraulic oil into each of the service brakes,
the separating block being provided in a manner offset in the vehicle width direction from a middle of the vehicle body frame in the vehicle width direction,
hydraulic lines connecting the separating block and each of the service brakes being arranged to pass approximately the middle of the vehicle body frame in the vehicle width.

9. The dump truck according to claim 8, further comprising a cab provided near an end of the dump truck in the vehicle width direction, the separating block being provided at a rear of the cab.

10. The dump truck according to claim 9, further comprising:
a service brake valve and a retarder control valve for adjusting a supply of the hydraulic oil to the service brake; and
a shuttle valve that outputs one of the hydraulic oil from the service brake valve and the hydraulic oil from the retarder control valve, the outputted one of the hydraulic oil having higher hydraulic pressure than the other,
the shuttle valve being provided at a rear of the cab,
a hydraulic line connecting the shuttle valve with the service brake valve and the retarder control valve being disposed to pass the middle of the vehicle body frame in the vehicle width.

11. The dump truck according to claim 10, wherein a brake device box of a box shape houses the shuttle valve and the separating block.

12. The dump truck according to claim 11, wherein the brake device box houses a solenoid valve for an exhaust brake.

13. The dump truck according to claim 12, wherein the brake device box houses an ABS cancellation valve and an ABS valve for an ABS.

14. The dump truck according to claim 11, wherein the brake device box houses an ABS cancellation valve and an ABS valve for an ABS.

15. A dump truck comprising:
wheels that are arranged on both sides of a vehicle body frame in a vehicle width direction;
service brakes that are provided on each of the wheels on both sides; and
a separating means for separating and outputting hydraulic oil into each of the service brakes, wherein the separating means is provided in a manner offset in the vehicle width direction from a middle of the vehicle body frame in the vehicle width direction,
hydraulic lines connecting the separating means and each of the service brakes being arranged to pass approximately the middle of the vehicle body frame in the vehicle width.

16. The dump truck according to claim 15, further comprising a cab provided near an end of the dump truck in the vehicle width direction, the separating means being provided at a rear of the cab.

17. The dump truck according to claim 16, further comprising:
- a service brake valve and a retarder control valve for adjusting a supply of the hydraulic oil to the service brake; and
- a shuttle valve that outputs one of the hydraulic oil from the service brake valve and the hydraulic oil from the retarder control valve, the outputted one of the hydraulic oil having higher hydraulic pressure than the other,
- the shuttle valve being provided at a rear of the cab,
- a hydraulic line connecting the shuttle valve with the service brake valve and the retarder control valve being disposed to pass the middle of the vehicle body frame in the vehicle width.

18. The dump truck according to claim 17, wherein a brake device box of a box shape houses the shuttle valve and the separating means.

19. The dump truck according to claim 18, wherein the brake device box houses a solenoid valve for an exhaust brake.

20. The dump truck according to claim 18, wherein the brake device box houses an ABS cancellation valve and an ABS valve for an ABS.

\* \* \* \* \*